United States Patent Office 3,298,491
Patented Jan. 17, 1967

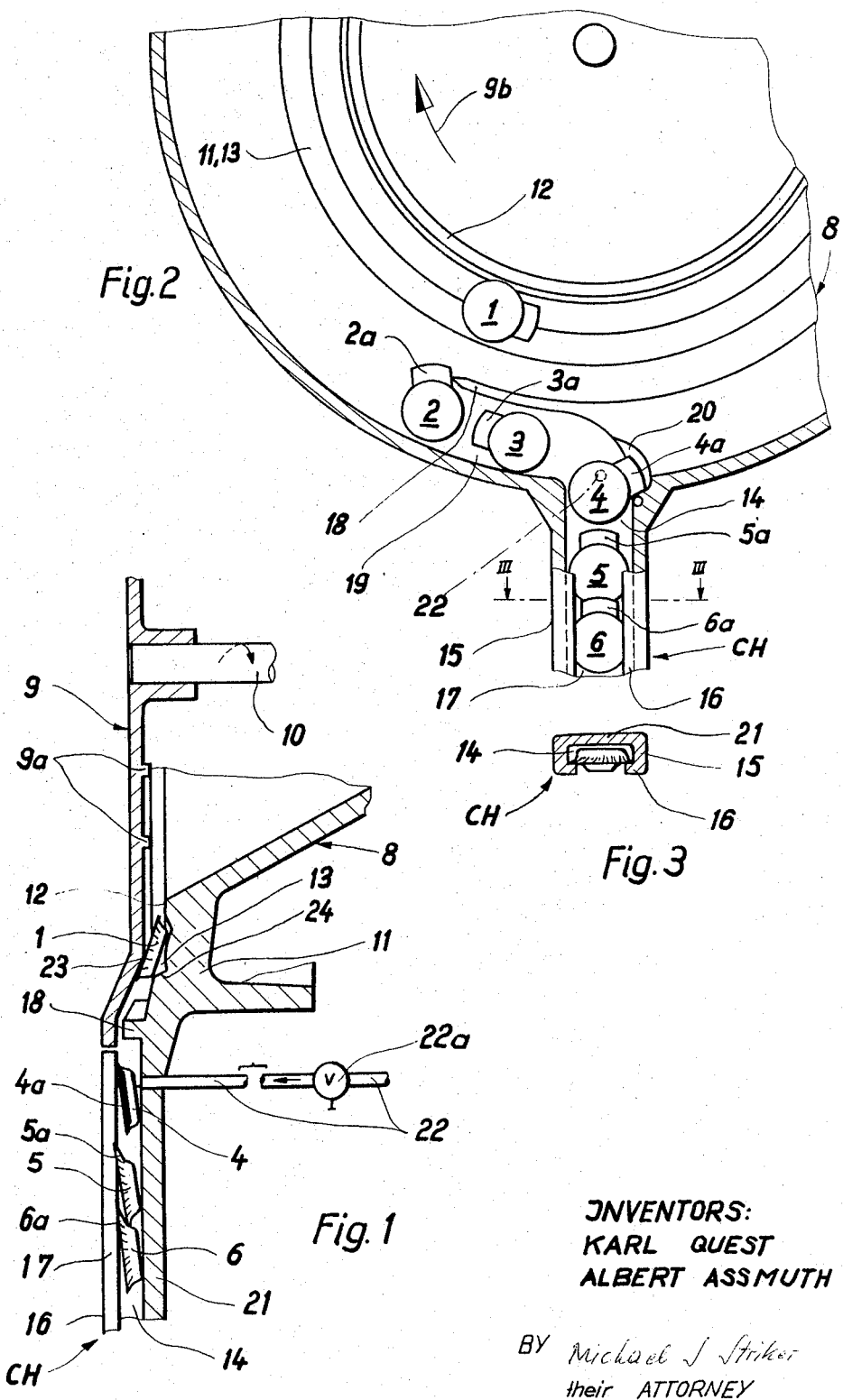

3,298,491
APPARATUS FOR ARRAYING AND FEEDING
BOTTLE CAPS AND THE LIKE
Karl Quest and Albert Assmuth, Dortmund, Germany, assignors to Holstein & Kappert Maschinenfabrik Phoenix G.m.b.H., Dortmund, Germany
Filed Mar. 23, 1965, Ser. No. 442,012
12 Claims. (Cl. 193—43)

The present invention relates to an apparatus for manipulating caps for bottles and the like. More particularly, the invention relates to an apparatus for arraying caps of the type provided with lifting flaps and for feeding such caps in orderly fashion to the head of a bottle capping machine.

It will well known that the head of a bottle capping machine must receive caps in such a way that each thereof may be gripped and transferred by a chuck which serves to apply caps to the tops of milk bottles, soda bottles, beer bottles and similar containers. If the caps are provided with lifting flaps (which serve to facilitate removal of the cap from a sealed bottle), the caps must be fed in such a way that all of the lifting flaps face in a predetermined direction whereby the caps are in a position to enter the chucks and to advance therewith to the actual capping station.

Accordingly, it is an important object of the present invention to provide a novel apparatus which is capable of automatically arraying caps for bottles and the like in such a way that each lifting flap faces in a predetermined direction whereby the caps may be fed directly to the head of a bottle capping machine.

Another object of the invention is to provide an apparatus of the just outlined characteristics which is capable of arraying the caps in a single file and in such a way that portions of adjoining caps overlie each other whereby the thus obtained single file consists of immediately adjacent and partially overlapping caps with the lifting flaps facing in the same direction.

A further object of the invention is to provide an apparatus of the above outlined characteristics which is capable of forming a single file of properly arrayed caps from a supply of randomly distributed caps.

A concomitant object of the present invention is to provide an apparatus of the above outlined characteristics wherein the properly arrayed caps may advance by gravity to be fed directly into the head of a bottle capping machine or another machine which may utilize such caps for orderly application to the tops of filled containers, e.g., to vitreous or plastic bottles and the like.

Still another object of the instant invention is to provide a novel arraying or sorting device which may be used in an apparatus of the above outlined characteristics.

A further object of the invention is to provide an apparatus whose arraying or sorting device automatically refuses to admit a cap which is not in a position capable of being incorporated in a single file of properly arrayed caps.

Another object of the present invention is to provide an apparatus wherein, once arrayed, the caps are positively guided all the way to the point where they enter a bottle capping machine so that there is no possibility of accidental misalignment prior to entry of caps into the capping station.

Still another object of the present invention is to provide an apparatus for arraying and feeding caps of the type provided with lifting flaps and which is constructed and assembled in such a way that its operation may be inspected at all times and that all of its parts are readily accessible, i.e., any pileup of caps which might take place in certain parts of the apparatus can be broken up without even necessitating that the apparatus be brought to a halt.

Another object of the invention is to provide a combined mechanical and pneumatic arraying apparatus for bottle caps wherein any improperly positioned caps which cannot enter the sorting device are automatically shuffled or otherwise moved until they assume positions in which they are free to enter the arraying station.

Briefly stated, one feature of our invention resides in the provision of an apparatus for manipulating caps for bottles and the like, particularly for arraying caps of the type having lifting flaps extending laterally from the open sides thereof and for feeding such caps to a capping station. The apparatus comprises a vertical or inclined chute defining a first channel arranged to convey a single file of properly arrayed and closely adjacent caps by gravity feed and on to the capping station, a source of randomly distributed caps including an open-ended receptacle, a rotary agitating member adjacent to the open end of the receptacle and defining therewith a restricting passage wide enough to receive and to permit gravitational descent of caps whose open sides face in a predetermined direction, preferably toward the inner side of the agitating member, and a partition extending into the receptacle in a zone beneath the restricting passage and defining with the receptacle a second channel having an intake end communicating with the restricting passage and a discharge end communicating with the upper end of the first channel so that the open side of each cap entering the second channel and advancing into the first channel faces in the same direction. The width of the channels is selected in such a way that the lifting flap of each cap advancing through the channels is located at the leading end or at the trailing end of the respective cap.

The apparatus further comprises means for turning all such caps whose flaps are located at the leading ends thereof, and such turning means is preferably located at the junction of the two channels so that the lifting flap of each cap entering the first channel is located at the trailing end of the respective cap.

In accordance with a further feature of our invention, the apparatus comprises tilting means for tilting each cap entering or advancing in the first channel in such a way that the open side of each trailing cap overlies the lifting flap of the preceding cap. The chute may be provided with a slot or recess which receives and guides the flaps of the thus tilted caps.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of a specific embodiment with reference to the accompanying drawings, in which:

FIG. 1 is a fragmentary vertical section through an arraying apparatus which embodies our invention and illustrates the manner in which the caps enter and leave the arraying station;

FIG. 2 is a view as seen from the left-hand side of FIG. 1, with the agitating device omitted for the sake of clarity;

FIG. 3 is a horizontal section as seen in the direction of arrows from the line III—III of FIG. 2.

Figure 4:
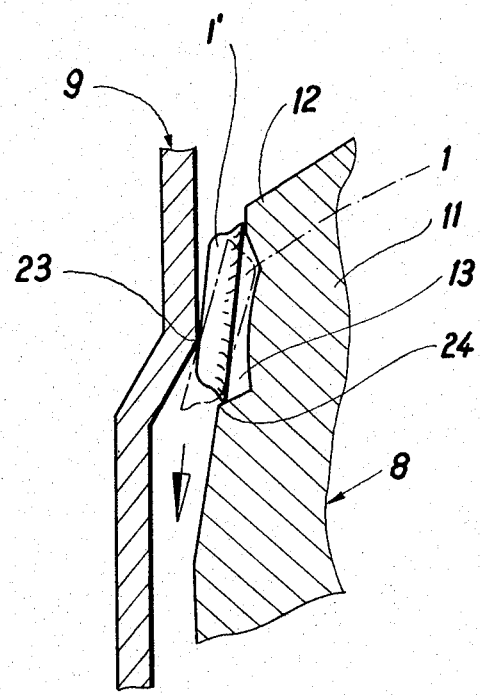
FIG. 4 is an enlarged view of a detail of the structure shown in FIG. 1.

Referring to the drawings, and first to FIGS. 1 and 2, there is shown a portion of an apparatus which is used for arraying and feeding caps of the type having open sides provided with laterally extending lifting flaps. Each flap is integral with a portion at the open side of the respective cap, and each cap comprises a corrugated edge portion which surrounds the open side and may be deformed to overlie the annular bead at the open top of a bottle or the like. The lifting flap then extends laterally or downwardly and may be grasped by fingers to facilitate removal of the cap without resorting to openers or similar tools.

The apparatus comprises a source of randomly distributed caps including a receptacle 8 which resembles a hopper having a horizontal axis and containing a supply of randomly distributed caps, not shown. The receptacle 8 may receive such caps from the machine which makes the caps, which provides each cap with an insert in the form of a cork pad, which provides the edge portions of caps with corrugations, or from another source. The larger-diameter end of the receptacle 8 is open and is sealed by a rotary agitating member 9 which is mounted on a horizontal shaft 10 and is driven by a chain or the like, not shown. The motor (or a suitable transmission) which drives the shaft 10 is not shown in the drawings. It suffices to say that the agitating member 9 resembles a disk which is located in a vertical or nearly vertical plane and whose inner side may be provided with ribs 23 and/or other projections 9a to insure that the randomly distributed caps in the hopper 8 are agitated without interruption and tend to descend to the lowermost zone of the internal space of the hopper.

The hopper 8 comprises an annular marginal portion 11 which is provided with an annular rib 12 and with an annular recess 13 which extends radially outwardly from the rib 12. The recess 13 is adjacent to the inner side of the agitating member 9 so that its outer side is closed and that this recess forms part of a restricting passage through which properly oriented caps may leave the receptacle 8. The rib 12 cooperates with the rib 23 of the agitating member 9 to insure that the recess 13 receives only such caps whose open sides face toward the inner side of the agitating member. A properly positioned cap 1 is shown in FIG. 1 by solid lines and in FIG. 4 by phantom lines. An improperly positioned cap 1' (shown by solid lines in FIG. 4) is prevented from fully entering the recess 13 and is entrained by one of several projections 9a provided at the inner side of the agitating member 9.

The distance between the ribs 12 and 24 of the hopper 8 is selected in such a way that the cap 1' is unable to enter the restricting passage extending along the rib 23 of the agitating member 9. However, the cap 1 is free to descend by gravity and enters a channel 19 whose upper side is bounded by a horizontal or nearly horizontal partition or lip 18. As shown in FIG. 2, the lip 18 is located at a level below the recess 13 and defines with the hopper 8 a channel 19 of such width that the lifting flap of each cap passing through the channel 19 must be located at the leading end or at the trailing end of the respective cap.

FIG. 2 illustrates a cap 2 whose open side faces the observer and which is about to enter the channel 19. It will be seen that the tip of the lip 18 abuts against the lifting flap 2a of the cap 2 and causes this cap to turn in a counterclockwise direction so that the flap 2a trails the remainder of the cap at the time the latter moves through the channel 19 and toward the upper end of a vertical or inclined chute CH defining a second channel 14 whose upper end communicates with the discharge end of the channel 19. The intake end of the channel 19 communicates with the aforementioned restricting passage including the lower part of the recess 13.

At the junction of the channels 14 and 19, the hopper 8 defines a flat pocket or recess 20 which forms part of a turning means and is wide enough to receive a lifting flap but not the remainder of the respective cap. As shown in FIG. 2, a cap 4 happened to enter the channel 19 in such a way that its flap 4a was located in front and, therefore, the flap 4a has moved into the pocket 20. Once the flap 4a enters this pocket, the cap 4 rotates by gravity (through an angle of approximately 90 degrees and in a counterclockwise direction, as viewed in FIG. 2) and descends into the channel 14 in such a way that the flap 4a is located at the trailing end thereof. The cap 3 is shown during movement through the channel 19 and is in such angular position that its flap 3a need not enter the pocket 20 because the flap 3a is located at the trailing end of the cap 3.

The apparatus of the present invention further comprises a device for tilting the caps at the time they enter or are about to enter the channel 14 so that the corrugated edge portion of each trailing cap overlies the lifting flap of the preceeding cap. This titlting device comprises a conduit 22 whose discharge end communicates with the junction between the channels 14, 19 and which emits a continuous stream of compressed air acting against the outer sides of the lifting flaps and serving to move the flaps away from the rear wall 21 of the chute CH. This chute further comprises two narrow side walls 15 and a front wall comprising two narrow strips 16 which define between themselves an elongated guide slot 17. The width of the slot 17 is less than the diameter of the corrugated edge portion of a cap but exceeds the width of a lifting flap so that the flap of a properly oriented cap enters the slot 17 while the respective cap travels in the channel 14 and onto the head of a capping machine, not shown. FIG. 1 shows a single file of properly arrayed and closely adjacent caps 4, 5, 6 whose lifting flaps 4a, 5a, 6a extend into the slot 17. The open side of each trailing cap overlies the lifting flap of the preceding cap. FIG. 3 shows that the distance between the walls 16, 20 exceeds the thickness or height of a cap so that the caps may be tilted by the continuous stream of compressed air issuing from the conduit 22 and that the properly arrayed caps may form a file which is free to descend by gravity and is not likely to jam the chute CH. Of course, the strength of the stream of compressed air is selected with a view to avoid excessive friction between the caps and the chute CH. The conduit 22 contains an adjustable valve 22a which will determine the pressure of air issuing from the conduit 22.

It will be seen that the improved apparatus comprises four important units, namely, means (including the ribs 12, 23, 24 and the recess 13) defining a restricting passage for preventing discharge of caps whose open sides face away from the agitating member 9, means 18 for turning each cap whose flap extends substantially upwardly so that the channel 19 receives only such caps whose flaps are located at the leading or at the trailing ends thereof (i.e., the maximum dimension of each cap which is allowed to enter the channel 19 extends in the longitudinal direction of this channel), means 20 for turning all such caps whose flaps are located at the forward ends thereof, and means 22 for tilting the caps prior to entry into the channel 14 of the chute CH. In other words, the improved apparatus insures that all caps which are to enter the channel 19 have their open sides facing in the same direction, and the apparatus also insures that the lifting flaps of caps which are to enter the channel 14 face in the same direction.

If the caps should pile up in the channel 14 the operator will be in a position to eliminate such pile-up by resorting to any suitable implement which can be inserted through the slot 17. The arrow 9b indicates the direction in which the agitating member 9 rotates.

The lip 18 preferably forms part of the right-hand side wall 15, as viewed in FIG. 2. If the chute CH is not integral with the hopper 8, the lip 18 may be formed as a separate part which is attached to the chute or to the hopper. The lip 18 prevents the caps which are contained in the hopper 8 from descending directly into the channel 14, i.e., a cap which is to enter the channel 14 must pass through the channel 19.

Caps which are provided with lifting flaps may be utilized on bottles which must be resealed by the user. For example, such caps can be used on milk bottles because the user can readily detach a cap by exerting a pull on the lifting flap, and the cap can be reapplied to form a seal or a cover for the top of the partially filled milk bottle. Also, a cap with a lifting flap is preferred by many users because it need not be removed by resorting to an opener. For example, a workman, an office worker or a spectator in a sports arena will prefer a bottle whose cap can be removed by fingers rather than by using an opener.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be secured by Letters Patent is:

1. In an apparatus for manipulating caps for bottles and the like, particularly for arraying and feeding caps of the type having lifting flaps extending laterally from the open sides thereof, in combination, a chute defining a first channel being so narrow as to permit only passage of caps the lifting flaps of which extend in direction of said channel, said chute arranged to convey a single file of caps by gravity feed and having an upper end; a source of randomly distributed caps including an open-ended receptacle; an agitating member adjacent to the open end of and defining with said receptacle a passage wide enough to receive and to permit gravitational descent of caps whose open sides face in a predetermined direction; wall means arranged in a zone located beneath said passage and defining with said receptacle a second channel having an intake end communicating with said passage and a discharge end communicating with the upper end of said first channel so that the open side of each cap entering said second channel and advancing into said first channel faces in said predetermined direction; and turning means arranged adjacent to one of said channels for turning all those caps whose flap is not located at the trailing end of the cap into a position in which said flaps are located at the trailing end of each cap.

2. In an apparatus for manipulating caps for bottles and the like, particularly for arraying and feeding caps of said channel, said chute arranged to convey a single the open sides thereof, in combination, a chute defining channel means being so narrow as to permit only passage of caps the lifting flaps of which extend in direction of said channels, said chute arranged to convey a single file of caps by gravity feed and having an upper end; a source of randomly distributed caps including a receptacle having an open end; agitating means adjacent to said open end and defining with said receptacle a passage wide enough to receive and to permit gravitational descent into said channel means only of those caps whose open sides face in a predetermined direction; and turning means arranged adjacent to said channel means for turning all those caps whose flap is not located at the trailing end of the cap into a position in which said flaps are located at the trailing end of each cap.

3. In an apparatus for manipulating caps for bottles and the like, particularly for arraying and feeding caps of the type having lifting flaps extending laterally from the open sides thereof, in combination, a chute defining a first channel arranged to convey a single file of caps by gravity feed and having an upper end; a source of randomly distributed caps including a receptacle having an open end; a rotary agitating member adjacent to said open end and defining with said receptacle a passage wide enough to receive and to permit gravitational descent of caps whose open sides face in a predetermined direction; a partition extending into said receptacle in a zone located beneath said passage and defining with said receptacle a second channel having an intake end communicating with said passage and a discharge end communicating with the upper end of said first channel so that the open side of each cap entering said second channel and advancing into said first channel faces in said predetermined direction, the width of each of said channels being such that the lifting flap of each cap advancing through said channels is located at the leading end or at the trailing end of the respective cap; and turning means adjacent to one of said channels for turning each such cap whose flap extends in a direction opposite to that of the preceding flap.

4. A structure as set forth in claim 3, wherein said second channel is inclined with reference to said first channel and wherein said turning means includes a pocket provided at the discharge end of said second channel, said pocket being so dimensioned that it receives a flap which is located at the leading end of a cap entering said discharge end whereby the respective cap turns while leaving said second channel and enters said first channel with the flap located at the trailing end thereof.

5. In an apparatus for manipulating caps for bottles and the like, particularly for arraying and feeding caps of the type having lifting flaps extending laterally from the open sides thereof, in combination, a chute defining a first channel arranged to convey a single file of caps by gravity feed and having an upper end, said chute having a front wall provided with a guide slot wide enough to accommodate a flap but too narrow to accommodate the remainder of a cap; a source of randomly distributed caps including a receptacle having an open end; a rotary agitating member adjacent to said open end and defining with said receptacle a passage wide enough to receive and to permit gravitational descent of caps whose open sides face in such predetermined direction that the open side of a cap entering said first channel is adjacent to said front wall; a partition extending into said receptacle in a zone located beneath said passage and defining with said receptacle a second channel having an intake end communicating with said passage and discharge end communicating with the upper end of said first channel so that the open side of each cap entering said second channel and advancing into said first channel faces in said predetemined direction, the width of each of said channels being such that the flap of each cap advancing through said channels is located at the leading end or at the trailing end of the respective cap; turning means adjacent to said second channel for turning each such cap whose flap is located at the leading end thereof so that all flaps entering said first channel are located at the trailing ends of the respective caps, and tilting means cooperating with said chute for tilting each consecutive cap in said first channel to such an extent that the flaps extend into and are guided by said slot.

6. A structure as set forth in claim 5, wherein said tilting means comprises means for directing a continuous stream of compressed gas against the flaps entering said first channel.

7. A structure as set forth in claim 6, wherein said tilting means comprises a valved conduit having a discharge end adjacent to the junction of said channels.

8. In an apparatus for manipulating caps for bottles and the like, particularly for arraying and feeding caps of the type having lifting flaps extending laterally from the open sides thereof, in combination, a downwardly inclined chute defining a first channel arranged to convey a single file of caps by gravity feed and in such a way that each flap is located at the trailing or at the leading end of the respective cap; said channel having an upper end; a source of randomly distributed caps including a hopper having an open end at one side thereof; an agitating member adjacent to said open end and defining with said hopper a restricting passage wide enough to receive and to permit gravitational descent of caps whose open sides face in a predetermined direction, said agitating member being rotatable about a substantially horizontal axis; a second channel having an intake end communicating with said restricting passage and a discharge end communicating with the upper end of said first channel so that the open side of each cap entering said second channel and advancing into said first channel faces in said predetermined direction, the width of said second channel being substantially identical with the width of said first channel; and turning means arranged between said second channel and said first channel for turning all those caps whose flap is not located at the trailing end of the cap into a position in which said flaps are located at the trailing end of each cap.

9. A structure as set forth in claim 8, wherein said agitating member is provided with projections arranged to remove from said restricting passage all such caps whose open sides face in a direction other than said predetermined direction.

10. A structure as set forth in claim 8, wherein the open side of each cap which enters said second channel faces said agitating member.

11. In an apparatus for manipulating caps for bottles and the like, particularly for arraying and feeding caps of the type having lifting flaps extending laterally from the open sides thereof, in combination, a chute defining a first channel being so narrow as to permit only passage of caps the lifting flaps of which extend in direction of said channel, said chute arranged to convey a single file of caps by gravity feed and having an upper end; a source of randomly distributed caps including a receptacle having an open end; a rotary agitating member adjacent to said open end and defining with said receptacle a restricting passage just wide enough to receive and to permit gravitational descent of caps whose open sides face in a predetermined direction; a partition extending into said receptacle in a zone located beneath said restricting passage and defining with said receptacle a second channel having an intake end communicating with said passage and a discharge end communicating with the upper end of said first channel so that the open side of each cap entering said second channel and advancing into said first channel faces in said predetermined direction, and a turning means arranged adjacent to one of said channels for turning all those caps whose flap is not located at the trailing end of the cap into a position in which said flaps are located at the trailing end of each cap.

12. In an apparatus for manipulating caps for bottles and the like, particularly for arraying and feeding caps of the type having lifting flaps extending laterally from the open sides thereof, in combination, a chute defining a first channel being so narrow as to permit only passage of caps the lifting flaps of which extend in direction of said channel, said chute arranged to convey a single file of caps by gravity feed and having an upper end; a source of randomly distributed caps; means defining with said source a restricting passage and arranged so as to permit gravitational descent through said channel of all such caps whose open sides face in a predetermined direction; and turning means arranged between said second channel and said first channel for turning all those caps whose flap is not located at the trailing end of the cap into a position in which said flaps are located at the trailing end of each cap.

References Cited by the Examiner

UNITED STATES PATENTS

| 1,332,279 | 3/1920 | Williams et al. | 221—172 |
| 1,775,141 | 9/1930 | Risser | 193—43 |
| 2,791,314 | 5/1957 | Meier | 221—173 X |

FOREIGN PATENTS 681,624  10/1952  Great Britain.

EVON C. BLUNK, *Primary Examiner.*

A. L. LEVINE, H. C. HORNSBY, *Assistant Examiners.*